(12) United States Patent
Luetke-Harmann et al.

(10) Patent No.: US 8,104,254 B2
(45) Date of Patent: Jan. 31, 2012

(54) FRONT ATTACHMENT FOR HARVESTING STALK PLANTS WITH INTAKE CONVEYOR, PICKING ASSEMBLY SEPARATING CROPS FROM STALKED PLANTS, AND GUIDE CHANNEL FOR GUIDING STALKED PLANTS

(75) Inventors: Tim Luetke-Harmann, Sendenhorst (DE); Walter Foegeling, Herzebrock-Clarholz (DE); Bernhard Aerdker, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 12/785,732

(22) Filed: May 24, 2010

(65) Prior Publication Data

US 2010/0300057 A1    Dec. 2, 2010

(30) Foreign Application Priority Data

May 28, 2009    (DE) .......................... 10 2009 022 970

(51) Int. Cl.
*A01D 45/02* (2006.01)
(52) U.S. Cl. ......................................................... 56/119
(58) Field of Classification Search .................... 56/119, 56/64, 60, 51, 503
See application file for complete search history.

(56) References Cited

U.S. PATENT DOCUMENTS

| 5,237,804 | A | * | 8/1993 | Bertling | 56/60 |
| 5,722,225 | A | * | 3/1998 | Wuebbels et al. | 56/60 |
| 5,845,472 | A | * | 12/1998 | Arnold | 56/94 |
| 5,852,922 | A | * | 12/1998 | Behrens et al. | 56/14.7 |
| 6,073,429 | A | * | 6/2000 | Wuebbels et al. | 56/11.3 |
| 6,119,443 | A | | 9/2000 | Rauch | |
| 6,158,201 | A | * | 12/2000 | Pruitt et al. | 56/6 |
| 6,298,643 | B1 | * | 10/2001 | Wuebbels et al. | 56/60 |
| 6,581,362 | B2 | * | 6/2003 | Rosenbalm et al. | 56/6 |
| 6,658,832 | B2 | * | 12/2003 | Wubbels et al. | 56/94 |
| 6,701,702 | B2 | * | 3/2004 | Wubbels | 56/103 |
| 6,718,743 | B2 | * | 4/2004 | Rosenbalm et al. | 56/6 |
| 6,775,967 | B2 | * | 8/2004 | Wubbels | 56/60 |
| 6,782,682 | B2 | * | 8/2004 | Steppat | 56/119 |
| 6,826,897 | B2 | * | 12/2004 | Wubbels | 56/51 |
| 6,959,529 | B2 | * | 11/2005 | Wubbels | 56/60 |
| 7,222,478 | B2 | * | 5/2007 | Bruening et al. | 56/51 |
| 7,578,118 | B2 | * | 8/2009 | Rickert et al. | 56/119 |
| 2003/0079457 | A1 | * | 5/2003 | Wubbels | 56/52 |
| 2008/0016837 | A1 | * | 1/2008 | Rosenbalm et al. | 56/192 |
| 2009/0071116 | A1 | * | 3/2009 | Barnett | 56/153 |

FOREIGN PATENT DOCUMENTS

DE    197 34 747    2/1999
DE    10 2005 021 792    11/2006

* cited by examiner

*Primary Examiner* — Arpad Fabian-Kovacs
(74) *Attorney, Agent, or Firm* — Michael J. Striker

(57) ABSTRACT

A front attachment for harvesting stalked plants has an intake conveyor mechanism that operates independently of the distance between rows, and a picking assembly located downstream thereof and transversely to the direction of travel, which separates the crops from the stalked plants and conveys them to a separate utilization, the plant stalks are guided in a guide channel from the intake conveyor mechanism to the picking channel, the guide channel is at least partially swept over, in the region of the intake conveyor mechanism, by driving elements of intake conveyor elements, which are situated in pairs and rotate in opposite directions, and, in the region of transfer to the picking assembly, the guide channel is at least partially swept over by driving elements of at least one rotating transfer element.

13 Claims, 4 Drawing Sheets

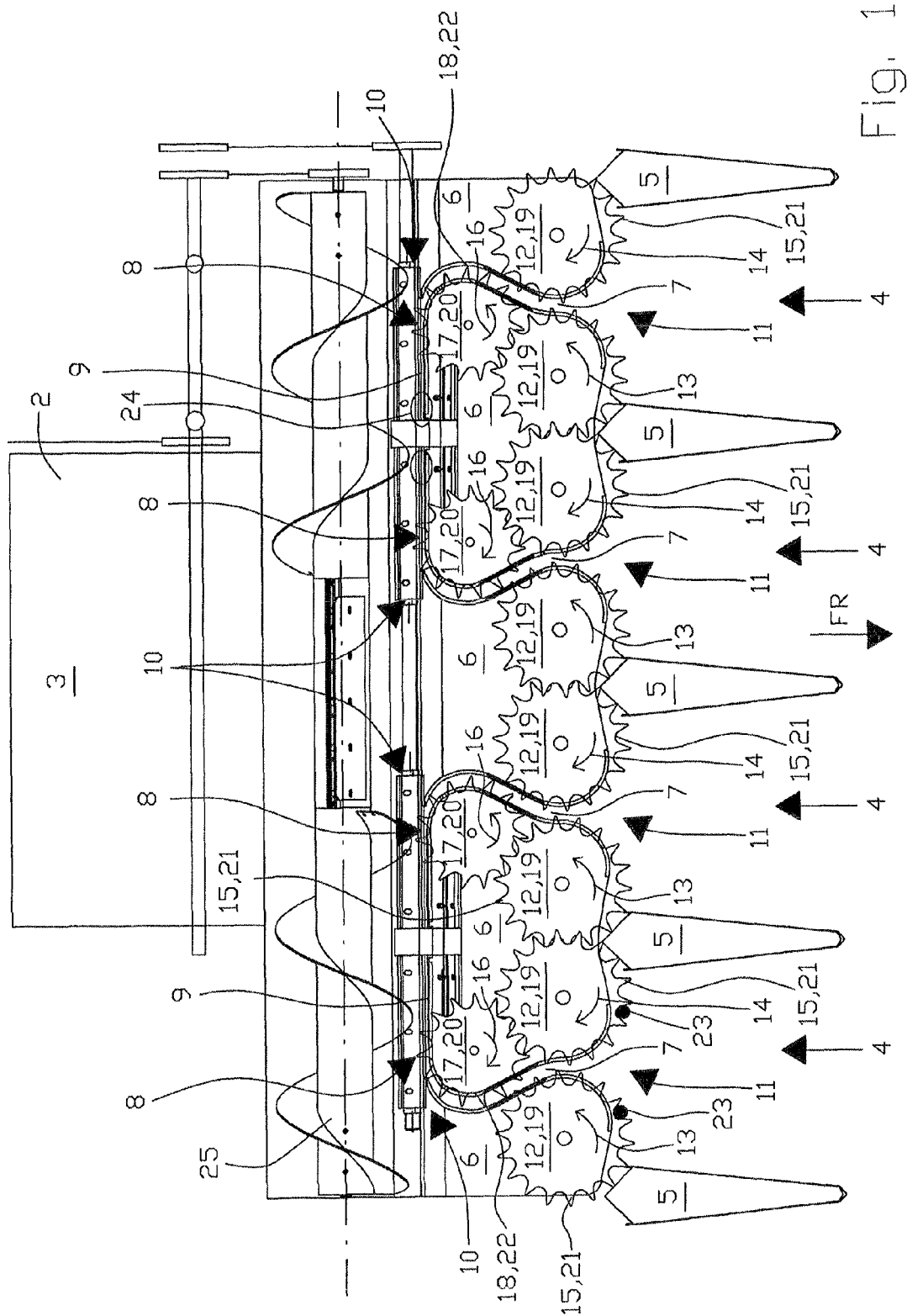

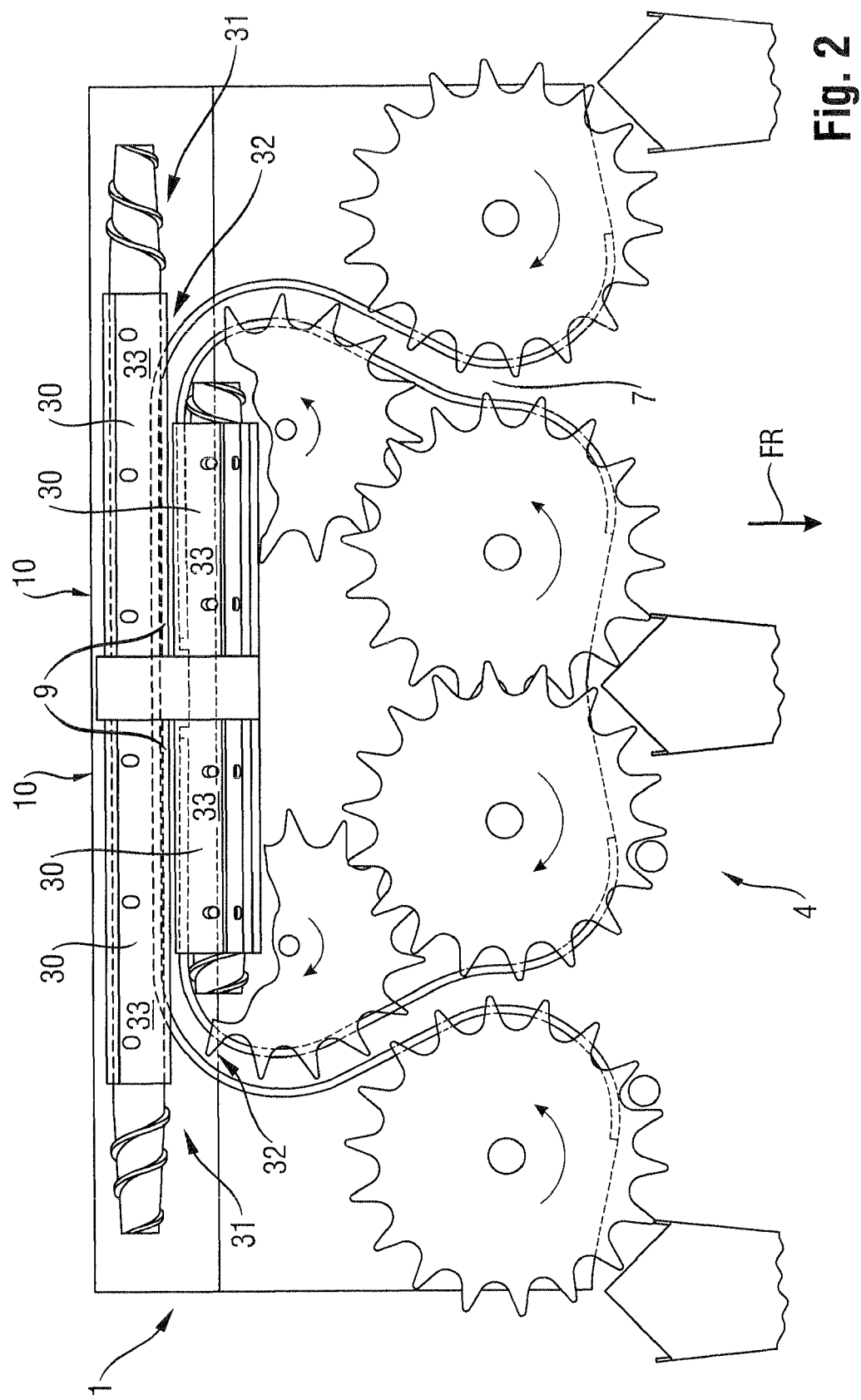

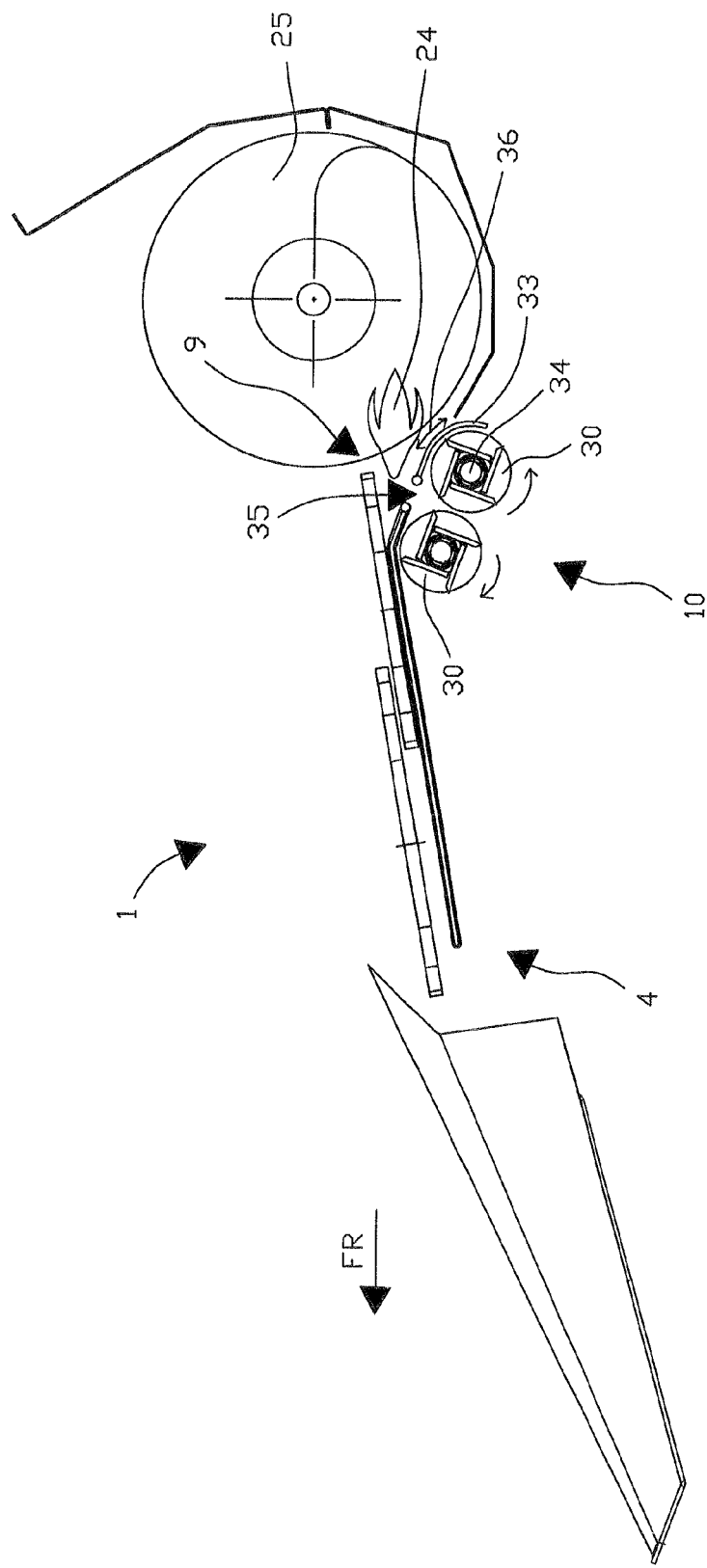

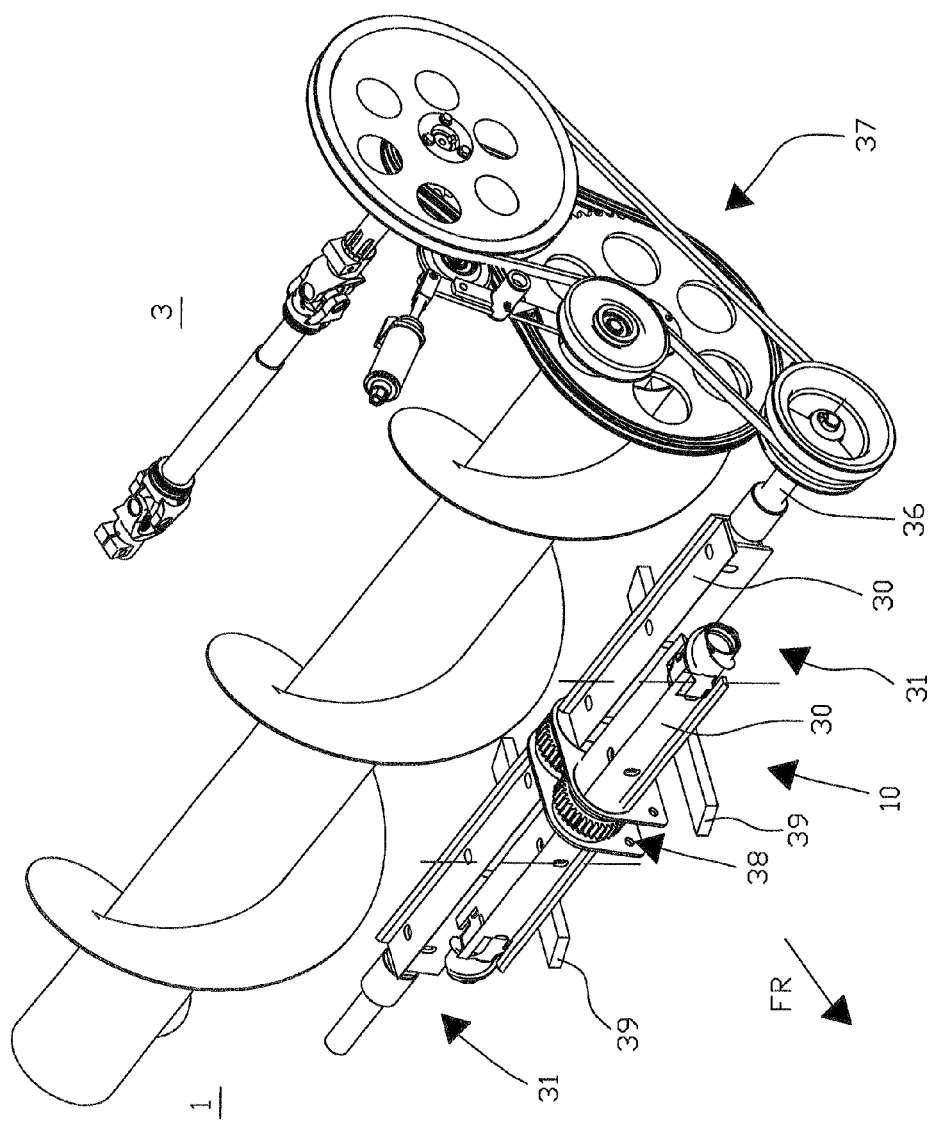

FRONT ATTACHMENT FOR HARVESTING STALK PLANTS WITH INTAKE CONVEYOR, PICKING ASSEMBLY SEPARATING CROPS FROM STALKED PLANTS, AND GUIDE CHANNEL FOR GUIDING STALKED PLANTS

CROSS-REFERENCE TO RELATED APPLICATION

The invention described and claimed hereinbelow is also described in German Patent Application DE 10 2009 022 970.1 filed on May 28, 2009. This German Patent Application, whose subject matter is incorporated here by reference, provides the basis for a claim of priority of invention under 35 U.S.C. 119(a)-(d).

BACKGROUND OF THE INVENTION

The present invention relates to a front attachment for harvesting stalked plants.

DE 197 34 747 made known a corn-harvesting front attachment of the type in question for installation on a self-propelled harvesting machine and that includes stalk-cutting mechanisms—which operate independently of the distance between rows—upstream of picking assemblies that separate the corn cobs from the plants and convey them to a separate utilization. In one variant of the embodiment, the picking assemblies, each of which is composed of picking rollers that operate in pairs, are located downstream of the particular stalk-cutting mechanism in a manner such that they extend substantially transversely to the longitudinal direction of the self-propelled harvesting machine. The plant stalks, which are harvested by the stalk-cutting mechanism and conveyed to the rear region thereof, are caught by a rotatably driven removal element which is assigned to the stalk-cutting mechanism in this region, and are transferred to the picking assemblies in the intake region thereof.

To ensure that the stalks may be reliably seized by the stalk-cutting mechanism and conveyed to the rear region thereof, the conveyor disks of the stalk-cutting mechanism include pocket-shaped recesses in which the stalks are held securely against the effect of centrifugal force. Due to this aggressive structure of the conveyor pockets, however, the rotational speeds of the stalk-cutting mechanism and the particular removal element located downstream thereof must be matched precisely to each other so that the stalks are transferred from the stalk-cutting mechanism to the particular picking assembly without causing material-flow problems. A control that is designed for this purpose is complicated and expensive. To ensure that every cutting and conveyor disk also has a relatively large working width, cutting and conveyor disks having a large diameter are used. Cutting and conveyor disks having this type of design also have the disadvantage that they must convey large quantities of crop material, which, in the case of high rates of crop-material throughput, results in material-conveyance problems since the conveying capacity is often lower than would be required for high rates of crop-material throughput.

A simplified means of conveying material for front attachments of that type was made known in DE 10 2005 021 792. The conveyor disks described therein include V-shaped recesses that offer no resistance to the effect of centrifugal force, and therefore removal elements are not required to transfer the plant stalks from the cutting and conveying mechanisms to the downstream picking assemblies, which are also situated transversely to the longitudinal direction of the agricultural harvesting machine. Stalk-cutting mechanisms designed in this manner have the disadvantage, however, that the plant stalks are likely to fall out of the conveyor pockets, due to the centrifugal force acting on them, as they travel from the front harvesting region to the rear transfer region. When crop-material throughput rates are low in particular, this may cause the plant stalks to fall out of the conveyor elements before they are seized by the picking assemblies, which ultimately results in considerable material-flow problems.

SUMMARY OF THE INVENTION

The object of the present invention, therefore, is to avoid the disadvantages of the related art described above and, in particular, to provide a front attachment for harvesting stalked plants that ensures that the plants are conveyed reliably out of the front harvesting region, and that the plant stalks are transferred reliably to the downstream picking assemblies.

In keeping with these objects and with others which will become apparent hereinafter, one feature of the present invention resides, briefly stated in a front attachment for harvesting stalked plants, comprising an intake conveyor mechanism operating independently of a distance between rows; a picking assembly located downstream of the intake conveyor mechanism and transversely to a direction of travel, and the picking assembly separating crops from the stalked plants and conveying the separated crops to a separate utilization; a guide channel in which the plant stalks are guided from the intake conveyor mechanism to a picking channel, wherein the guide channel is at least partly swept over, in a region of the intake conveyor mechanism, by driving elements of intake conveyor elements, which are situated in pairs and rotate in opposite directions, wherein in a region of transfer to the picking assembly the guide channel is at least partially swept over by driving elements of at least one rotating transfer element.

Given that the front attachment for harvesting stalked plants is designed such that the plant stalks are conveyed from the intake conveyor mechanism to the picking gap in a guide channel, and the guide channel is at least partially swept over in the region of the intake conveyor mechanism by driving elements of intake conveyor elements, which are situated in pairs and rotate in opposite directions, and, in the region of transfer to the picking assembly, the guide channel is at least partially swept over by driving elements of at least one rotating transfer element, it is ensured that the plants are reliably conveyed from the front harvesting region, and the plant stalks are transferred reliably to the downstream picking assemblies.

In an advantageous embodiment of the present invention, the intake conveyor elements are designed as tine disks, and the driving elements, which are designed as tines, point radially outwardly, and therefore the rotating intake conveyor elements release the crop stalks, due merely to the action of centrifugal force, and separate removal elements may be eliminated.

To optimize the transfer of crop stalks from the intake conveyor elements to the picking assemblies, the at least one transfer element is designed as a tine disk, and the driving elements, which are designed as tines, are designed such that they trail the direction of rotation of the transfer element. This has the effect that the trailing tines reliably convey the crop stalks into the intake region of the picking assemblies, and the crop stalks may fall off of the trailing tines in this region without a backlog of crop material forming.

To shorten the crop-material conveyance paths in the front attachment, in an advantageous embodiment of the present invention, the guide channel leads directly into a picking channel, in the region of the picking assembly.

To ensure that the crop stalks may be likewise reliably conveyed along the picking channel, the driving elements of the at least one transfer element sweep over the picking channel, at least partially, in a subregion of the length of the picking channel.

In an advantageous development of the present invention, the rotational speeds of the intake conveyor elements and/or the at least one transfer element may be changed as a function of the ground speed, thereby making it possible to adapt the intake conveyor speed of the front attachment to the crop-material throughput rate.

A structure that has a particularly simple design, and a cost-favorable implementation of this structure result when the intake conveyor elements and the at least one transfer element are designed as chain wheels.

Given that the rotational speed of the at least one transfer element is adjustable such that the plants in the intake region of the picking assembly are drawn through the picking assembly at an oblique, slanted angle, the effect results that the crop stalks are drawn through the picking assembly along the entire length of the picking channel without the need for the driving elements of the transfer element to sweep over the entire length of the picking channel.

A structure of the front attachment that is compact and makes possible a short overall length of the front attachment results when, in an advantageous embodiment of the present invention, the picking assembly is formed by picking rollers that are situated in pairs, are driven in opposite directions, and are located transversely to the direction of travel, one picking roller being located behind the other picking roller in the direction of travel.

A structure of the drive train for the front attachment that includes few components and is compact and, therefore, cost-favorable results when every two pair of picking rollers are positioned in a mirror-image configuration, and every pair of picking rollers leads into a separate guide channel.

In an advantageous embodiment of the present invention, a large number of picking assemblies and intake conveyor mechanisms situated in front thereof is located along the working width of the front attachment, thereby enabling the front attachment to be designed also for very large working widths.

To ensure that the crop is conveyed out of the picking assemblies without the use of additional removal elements, it is provided in an advantageous embodiment of the present invention that the front and rear picking rollers, which are situated in pairs, are slanted in the vertical direction, and that the rear—relative to the direction of travel—picking roller assumes a lower position in the vertical direction. This has the effect that the crop is conveyed out of the region of the picking assemblies merely via the action of centrifugal force.

A further optimization of the drive-train structure is attained by the fact that, in an advantageous embodiment of the present invention, the rear—relative to the direction of travel—picking rollers are penetrated by a continuous drive shaft. The compactness of the drive train may also be further enhanced, according to a development of the present invention, by coupling the front—relative to the direction of travel—picking rollers via spur gearboxes directly to the drive shaft of the rear picking rollers.

In an advantageous embodiment, the compactness of the front attachment is also enhanced by assigning a picking gap, which is limited by snapping plates that are situated in pairs, to the picking rollers—which are situated in pairs—at the top; the snapping plate which is assigned to the rear—relative to the direction of travel—picking roller is rotatable about the axis of rotation of the rear picking roller in order to adjust the width of the picking gap. This has the effect, in particular, that less installation space need be made available as compared to the horizontal displacement of the snapping plate for the snapping plate mechanism.

The drawing of the crop stalks through the picking assemblies is also enhanced by designing the rear—relative to the direction of travel—picking roller to be longer than the front picking roller which is located ahead of it, and by designing each of the picking rollers, which are located in pairs, conical in shape in the intake region. This has the effect, in particular, that the rear picking roller performs its picking function and simultaneously supports the conveyance of crop stalks into the intake conveyor region of the picking assemblies.

In order to supply the combine harvester with a compact flow of crop material, it is provided in an advantageous embodiment of the present invention that a cross auger component that moves the crop toward the center is assigned to a large number of picking assemblies.

Depending on whether the objective is to support the shortest possible design of the front attachment or to ensure that the crop stalks are conveyed in an approximately perpendicular position that reduces material backlogs, it is provided in an advantageous development of the present invention that the intake conveyor mechanism(s) and the picking assemblies located downstream thereof are situated in the front attachment such that they are slanted relative to the direction of travel, or they are situated horizontally.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a top view of the front attachment according to the present invention FIG. 2. shows a detailed view of an intake conveyor mechanism of the front attachment according to the present invention FIG. 3 shows a schematic side view of the front attachment according to the present invention FIG. 4 shows a section of the drive train of the front attachment according to the present invention

DESCRIPTION OF THE PREFERRED EMBODIMENTS

FIG. 1 shows a schematic depiction of front attachment 1, according to the present invention, for harvesting stalked plants, preferably corn, which is adapted in its rear region to feed rake 2 of a combine harvester 3 which is not depicted. In its front—relative to direction of travel FR—region, front attachment 1 includes a large number of intake conveyor mechanisms 4, each of which is separated from the other via forward-pointing dividers 5. Every intake conveyor mechanism 4 includes a guide channel 7 that is bordered by cover plates 6, and that leads, in a rear transition region 8, into picking channel 9 which extends transversely to direction of travel FR; a picking assembly 10 is assigned to each guide channel 7, on the underside, in a manner to be described in greater detail below.

In crop-material entry region 11, intake conveyor elements 12, which are situated in pairs and are driven in opposite directions of rotation as indicated by arrow directions 13, 14, are assigned to each guide channel 7 on the top side. Radially outwardly extending driving elements 15 are integrally formed on each intake conveyor element 12, around its circumference, and at least partially sweep over guide channel 7 as intake conveyor elements 12 rotate. At least one transfer element 17, which rotates in arrow direction 16, is located downstream of intake conveyor elements 12, which are situated in pairs, in region of transfer 8 to particular picking assembly 10; driving elements 18 of transfer element 17 likewise at least partially sweep over guide channel 7. Intake conveyor elements 12 and transfer element 17 are designed as tine disks 19, 20, or as chain wheels in the simplest case. To improve crop-material pick-up and release, driving elements 15—which are designed as tines 21—of intake conveyor elements 12 designed as tine disks 19 extend radially outwardly. To ensure that transfer element 17 may reliably transfer the plant stalks to particular picking assembly 10, driving elements 18—which are designed as tines 22—of transfer elements 17 which are likewise designed as tine disks 20—extend such that they trail the direction of rotation of transfer element 17. In addition, every transfer element 17 is positioned in transfer region 8 in a manner such that its driving elements 18 at least partially sweep over picking channel 9 on a subregion of its length.

During harvesting operation, driving elements 15 of intake conveyor elements 12 seize plant stalk(s) 23 and draw it/them into particular guide channel 7, while the root of particular plant stalk 23 is still anchored in the ground. Via the forward motion of front attachment 1 as indicated by arrow direction FR, the deformation of plant stalk 23 is limited to the conveyance of plant stalk 23 transversely to direction of travel FR. Regardless of whether intake conveyor elements 12 and particular transfer element 17 are driven mechanically, hydraulically, or electrically, the rotational speed of all intake conveyor and transfer elements 12, 17 may be coupled to the ground speed of combine harvester 3, and therefore higher rotational speeds may be set when ground speeds are high, and lower rotational speeds may be set when ground speeds are low, thereby making it possible to adapt the conveyance effect to the anticipated crop-material throughput rate.

Since transfer element 17 also works together with picking assemblies 10, its rotational speed setting may also be used to bring about a conveyance effect of plant stalks 23 in the longitudinal direction of picking channel 9 that is more intensive than the speed at which plant stalks 23 are drawn through particular picking assembly 10. This has the effect that plant stalks 23 become slanted in the longitudinal direction of picking channel 9, which ultimately results in plant stalk 23 entering picking assembly 10 along the entire length of picking channel 9, without picking assemblies 10 themselves having to cause plant stalks 23 to move along picking channel 9. While plant stalks 23 pass through picking assemblies 10, which will be described in greater detail below, crops 24 are retained above particular picking channel 9, and are transferred in a manner to be described in greater detail below to a cross auger component 25 that is located downstream of picking assemblies 10, moves crops 24 toward the center of front attachment 1, and conveys them into feed rake 2 of combine harvester 3.

FIG. 2 shows a detailed view of picking assemblies 10 which are located downstream of intake conveyor mechanisms 4. Each picking assembly 10 is formed by picking rollers 30 that are situated in pairs and are driven in opposite directions, one picking roller 30 being located downstream of the other picking roller 30 in the direction of travel. In the embodiment shown, every two pair of picking rollers 31 is positioned in a mirror-image configuration, and every pair of picking rollers 31 leads into a separate guide channel 7. It lies within the scope of the present invention for a large number of picking assemblies 10 and intake conveyor mechanisms 4 located in front thereof to be located along the working width of front attachment 1. In addition, rear—in direction of travel FR—picking roller 30 is designed longer than front picking roller 30 located in front of it; picking rollers 30, which are situated in pairs, are conical in shape in intake region 32. Picking channel 9, which was described above, is formed by snapping plates 33, which are situated in pairs and are assigned, at the top, to picking rollers 30 which are likewise situated in pairs.

As shown in the schematic side view of front attachment 1 in FIG. 3, snapping plate 33 assigned to rear—relative to direction of travel FR—picking roller 30 is rotatable in direction of arrow 36 about axis of rotation 34 of rear picking roller 30 in order to adjust picking gap width 35. Furthermore, front and rear picking rollers 30, which are situated in pairs, are slanted in the vertical direction, the rear—relative to direction of travel FR—picking roller 30 assuming a lower position in the vertical direction, and therefore crops 24 that are separated on picking channel 9 are transferred via the force of gravity to downstream cross auger component 25. FIG. 3 also shows that intake conveyor mechanism(s) 4 and picking assemblies 10 situated downstream' thereof are slanted in direction of travel FR. It is within the scope of the present invention for intake conveyor mechanisms 4 and picking assemblies 10 located downstream thereof to also be situated horizontally, in a manner that is not depicted.

Finally, FIG. 4 shows the drive structure of picking assemblies 10. Rear—relative to direction of travel FR—picking rollers 30 are penetrated by a continuous drive shaft 36. Drive shaft 36 is driven at one end, in a manner known per se, via a drive train 37 by combine harvester 3 that accommodates front attachment 1. Front—relative to direction of travel FR—picking rollers 30 are coupled via a spur gearbox 38 to drive shaft 37 of rear picking rollers 30; when picking assemblies 10 are situated in a mirror-type configuration, a single spur gearbox 38 for both picking roller pairs 31 is provided. To ensure that the plant stalks that are ejected on the bottom side by picking assemblies 10 decompose in an optimal manner, stalk choppers 39 that rotate on the underside may be assigned to picking assemblies 10 in a manner known per se.

It will be understood that each of the elements described above, or two or more together, may also find a useful application in other types of constructions differing from the types described above.

While the invention has been illustrated and described as embodied in a front attachment for harvesting stalked plants, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:
1. A front attachment for harvesting stalked plants, comprising an intake conveyor mechanism operating independently of a distance between rows; a picking assembly located downstream of the intake conveyor mechanism and trans- versely to a direction of travel, and said picking assembly separating crops from the stalked plants and conveying the separated crops to a separate utilization; a guide channel in which the plant stalks are guided from the intake conveyor mechanism to a picking channel, wherein in a region of said intake conveyor mechanism driving elements of intake conveyor elements, which are situated in pairs and rotate in opposite directions, wherein in a region of transfer to said picking assembly driving elements of at least one rotating transfer element are located at least partly over said guide channel, wherein said picking assembly includes picking rollers that are situated in pairs, are driven in opposite directions, and are situated transversely in the direction of travel, one of the picking rollers being located behind another of the picking rollers in the direction of travel, and wherein a rear one of the picking rollers, in a direction of travel, is longer than a front one of the picking rollers located in front of it, and said picking rollers which are located in pairs are conical in an intake region.

2. The front attachment for harvesting stalked plants as defined in claim 1, wherein said intake conveyor elements are tine disks, and wherein the driving elements are tines extending radially outwardly.

3. The front attachment for harvesting stalked as defined in claim 1, wherein said at least one transfer element is a tine disk, and said driving elements are tines that trail in a direction of rotation of the transfer element.

4. The front attachment for harvesting stalked plants as defined in claim 1, wherein said guide channel leads to the picking channel in a region of the picking assembly.

5. The front attachment for harvesting stalked plants as defined in claim 1, wherein said driving elements of the at least one transfer element are located at least partially over the picking channel on a subregion of a length of the picking channel.

6. The front attachment for harvesting stalked plants as defined in claim 1, wherein a component selected from the group consisting of said intake conveyor elements, said at least one transfer element, and both have a rotational speed which is changeable as a function of a ground speed.

7. The front attachment for harvesting stalked plants as defined in claim 6, wherein the at least one transfer element has the rotational speed which is adjustable so that the plant stalks in an intake region of said picking assembly are drawn through said picking assembly at an oblique, slanted angle.

8. The front attachment for harvesting stalked plants as defined in claim 1, wherein every two pairs of the picking rollers have a mirror-image configuration, and each pair of the picking rollers leads to a separate guide channel.

9. The front attachment for harvesting stalked plants as defined in claim 1, wherein a plurality of picking assemblies and intake conveyor mechanisms located in front of the picking assemblies are located along a working width of the front attachment.

10. The front attachment for harvesting stalked plants as defined in claim 1, wherein a continuous drive shaft extends through the rear picking rollers.

11. The front attachment for harvesting stalked plants as defined in claim 1, wherein the front picking rollers are coupled via a spur gearbox to a drive shaft of the rear picking rollers.

12. The front attachment for harvesting stalked plants as defined in claim 1, wherein the picking channel is limited by snapping plates situated in pairs and located at a top to the picking rollers situated in pairs, and one of the snapping plates that is associated with a rear one of the picking rollers, relative to the direction of travel, is rotatable about an axis of rotation of a rear picking roller in order to adjust a picking gap width.

13. The front attachment for harvesting stalked plants as defined in claim 1, further comprising a cross auger component moving a crop toward a center and associated with a number of picking assemblies.

* * * * *